United States Patent

[11] 3,618,526

| [72] | Inventor | Robert L. Baker<br>Granada Hills, Calif. |
|---|---|---|
| [21] | Appl. No. | 861,395 |
| [22] | Filed | Sept. 26, 1969 |
| [45] | Patented | Nov. 9, 1971 |
| [73] | Assignee | The United States of America as<br>represented by the Secretary of the Navy |

[54] PYROTECHNIC PUMPED LASER FOR REMOTE ORDNANCE INITIATION SYSTEM
6 Claims, 3 Drawing Figs.

| [52] | U.S. Cl. | 102/70.2,<br>60/39.82, 331/94.5 |
|---|---|---|
| [51] | Int. Cl. | F42b 5/08 |
| [50] | Field of Search | 331/94.5;<br>60/39.82; 102/70.2 |

[56] References Cited
UNITED STATES PATENTS

| 3,258,910 | 7/1966 | Seymour | 60/256 |
|---|---|---|---|
| 3,271,696 | 9/1966 | DeMent | 331/94.5 P |
| 3,408,937 | 11/1968 | Lewis et al. | 60/39.82 R |
| 3,414,838 | 12/1968 | DeMent | 331/94.5 R |

Primary Examiner—Samuel Feinberg
Attorneys—Justin P. Dunlavey, Ervin F. Johnston and Thomas G. Keough ABSTRACT: A bundle of fiber-optic strands extends to a plurality of detonator assemblies each mounted on an individual ordnance having a portion responsive to coherent light for detonating the ordnance. The opposite end of the fiber-optic bundle is connected to a "one shot" pyrotechnic actuated laser apparatus. The apparatus includes a tubular outer case, the inner surface of which is coated with a pyrotechnic material, coaxially positioning a laser material having an oppositely disposed, totally reflective surface and a partially transparent mirror surface. An external high-voltage source is coupled to a squib, operatively disposed in the pyrotechnic coating, to initiate a pulsed flash within the casing. The flash pumps the lasing material, creating a burst of coherent light to be transmitted via the fiber-optic bundles to detonate the remotely disposed ordnances. A highly reliable ordnance initiation system results that is impervious to external electromagnetic radiation and does not have circuit deficiencies inherent in electrical ordnance initiation systems.

PATENTED NOV 9 1971 3,618,526

INVENTOR.
ROBERT L. BAKER
BY
THOMAS G. KEOUGH
ERVIN F. JOHNSTON
ATTORNEYS

PYROTECHNIC PUMPED LASER FOR REMOTE ORDNANCE INITIATION SYSTEM

STATEMENT OF GOVERNMENT INTEREST

The invention described herein may be manufactured and used by or for The Government of The United States of America for governmental purposes without the payment of any royalties thereon or therefor.

BACKGROUND OF THE INVENTION

Those employing ordnance in military and civilian applications have long been plagued by the ever present possibility of overall misfire or failure to actuate critical subcomponents in complex ordnance systems, as well as failing to actuate explosive disconnects or similar device devices launching missiles. Redundancy for reliability in the initiation systems greatly increases weight and cost and is, therefore, ruled out where these considerations govern. Most contemporary ordnance initiation systems employ electrical circuitry having long leads extending from a source of electrical energy to a detonating squib carried on the ordnance. The lengths of wire involved introduce a new hazard to reliable, safe detonation since the electrical leads tend to act as receiving antennas for any external electromagnetic energy. Attempts to avoid the problems encountered when using electrical conductors, have resulted in the production of lasers designed to be directly mounted on the ordnance that optically communicates with the ordnance. A well-known xenon flash tube actuator has been developed, but it is large and cumbersome, as are all similar lasers, and the tube is relatively delicate for use where shock and vibrations are encountered.

SUMMARY OF THE INVENTION

The present invention is directed to providing a self-contained apparatus for remotely initiating ordnance by a detonator responsive to coherent light. A fiber-optic bundle is joined to each detonator and extends to a laser unit for producing coherent light. The unit includes a tubularly shaped case housing a coaxially disposed elongate laser element, having its partially transparent mirror surface optically joined to the end of the fiber-optic bundle. The opposite end of the laser element carries a totally reflective mirror and the entire element is surrounded by a pyrotechnic coating evenly disposed on the inner surface of the case. Through an aperture, an electrically actuated explosive squib is placed in contact with the pyrotechnic coating and has its leads terminating in the source of high-potential electric power. Closing the squib, high-potential circuit ignites the pyrotechnic coating creating a flash that pumps the laser element to produce coherent light. The light is passed through the fiber-optic bundle to the remotely disposed detonators to simultaneously, separately actuate a plurality of ordnance, reliably and free from premature detonation caused by external electromagnetic radiation.

DESCRIPTION OF THE PREFERRED EMBODIMENTS

Figure 1:
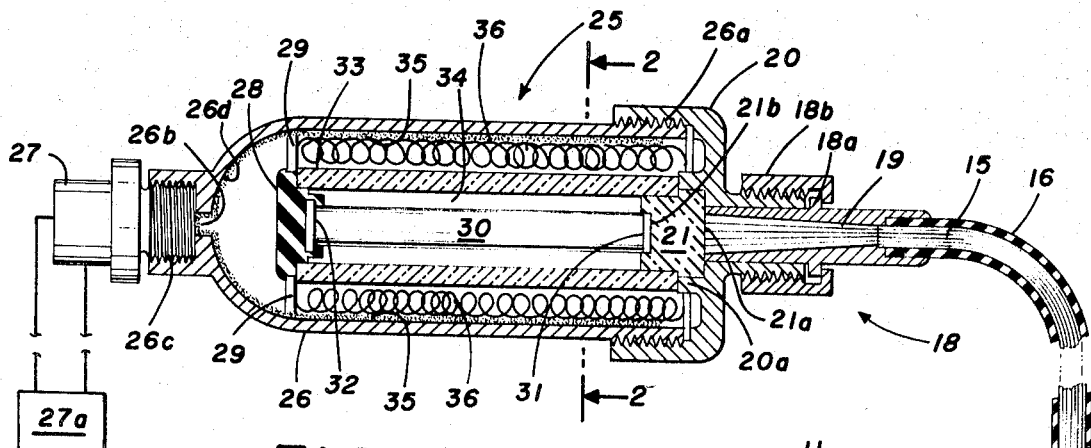
FIG. 1 is a partial cross-sectional representation of the invention operatively joined to two remotely disposed detonator assemblies.
Figure 2:
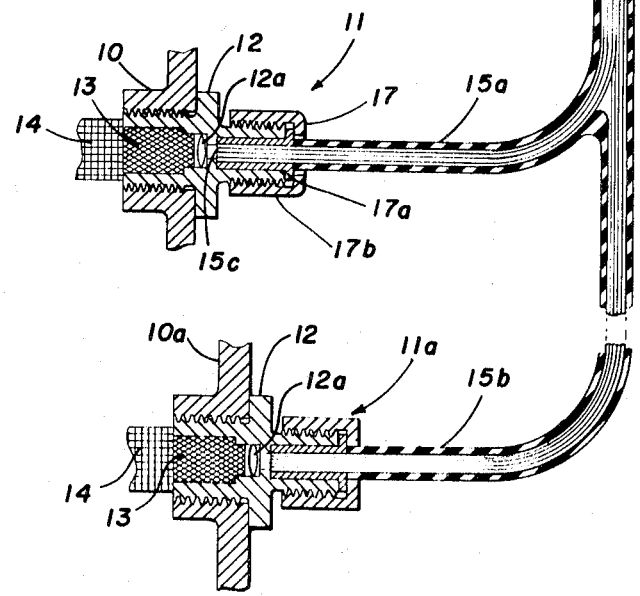
FIG. 2 is a cross-sectional view of the coherent light-producing unit taken along lines 2—2 in FIG. 1.

Referring now to the drawings, FIG. 1 depicts a cross-sectional view of an apparatus for initiating remotely disposed ordnance 10 and 10a. The ordnances are explosives, missile initiation charges, explosive-disconnects, or the like. Screwed or force-fitted into each ordnance, a conventional detonator assembly 11 or 11a is formed of an outer bushing 12 containing a primary explosive compound 13 such as tetrazine and a secondary or booster, explosive 14 such as RDX (cyclotrimethyleneprinitraime) or PETN (pentaerythritetetranitrate).

The primary explosive, tetrazine, has a low explosion temperature of approximately 154° centigrade and is also sensitive to impact. In an uncompressed or unpressed composition, the tetrazine detonates PETN by flame or heat alone, that is to say, the heat produced by a high energy burst of coherent light brings tetrazine to its explosion temperature to ignite the PETN booster explosive. A lens window 12a is included to aid in concentrating the coherent light on the primary explosive compound to ensure its detonation.

A bundle of optic-fibers 15 is encased in an opaque nonconductive protective sheath 16, separated and branching out in a first branch 15a, and a second branch 15b. The total amount of fibers in the two branches is identical to the total amount of fiber in the bundle 15 although optical "Y" fibers are optionally applied to give substantially the same number of fibers in each branch. In a particular application, the diameters of the optic fibers forming the bundles are approximately "0.005,"b0 but they may be as large in diameter as possible, consistent with the flexibility and bend radii required to reach the plurality of remotely disposed ordnance.

Both branch 15a and branch 15b terminate in a detonator adapter link 17. A flange 17a is provided on the outermost extension of each of the branches, noting branch 15a, to prevent a coaxially disposed connector sleeve 17b from slipping off the end of the branch. Internal threads in the connector sleeve are formed to match threads provided on the outer surface of bushing 12 to hold an inwardmost end 15c of the fiber-optic bundle in contact with a lens window 12a. The lens window is, preferably, a plano-convex lens which converges the relatively parallel light beam of coherent light emerging from the fiber-optic bundle to a small diameter spot having a relatively high radiant intensity, onto the outer surface of primary explosive 13. To enhance the assurance of detonation, the surface of the primary explosive receiving the high-intensity spot, in addition to being composed of a low-explosion temperature compound, has a darkened surface to increase its absorption of ignition-producing coherent light.

At the opposite end of the bundle of fiber-optics 15, a connecting arrangement 18 is attached that is substantially identical to the detonator adapter link by having a flange 18a and an axially disposed connecting sleeve 18b. The innermost end 15d of the fiber-optics is disposed immediately adjacent a fiber-optic light intensifier 19 consisting of a plurality of tapered optical fibers, the purpose of which is to reduce the cross-sectional area of an impinging coherent light beam and increase the output of radiant energy intensity per unit area. Thus, the intensifier is advantageously employed in the instant invention by permitting the use of a larger laser to compensate, to a substantial degree, for light loss in the fibers and optical interferences. Use of a larger laser is a desired expedient since laser energy output is proportional to the volume of the laser rod.

An essentially flange-shaped coupling 20 mechanically cooperates to house the fiber-optic light intensifier, as well as providing an annular projection 20a for supporting a light window 21. The light window is constructed of a heat and pressure resistant transparent material that freely permits the passage of light while not being substantially affected by a flash of heat and concussion. An outer side 21a of the light window is placed to abut the wide or base ends of the tapered fibers and, at its opposite side 21b, to rest against a partially transparent mirror surface 31 carried on an elongate, rod-shaped laser material 30.

The laser material forms the heart of the coherent light-producing unit 25 and is concentrically disposed in a tubularly shaped pressure resistant, opaque casing 26. The casing has circumferential threads 26a mechanically cooperating with corresponding threads provided on an inner surface of flange-shaped coupling 20 and an aperture 26b is included at its opposite end that reaches to a female internally threaded bore 26c.

A highly reliable electrically initiated squib 27, such as an exploding bridge wire is disposed and is screwed into the bore. A representative squib is fired by a relatively high voltage, equaling approximately 2,000 volts, to break down a built-in spark gap to release sufficient energy in the bridge wire to fire a relatively insensitive squib initiator charge such as the aforereferred to PETN or RDX.

An operatively associated source of high voltage energy 27a, for example a charged capacitor, is selectively connected to the squib to effect its detonation. The source is shielded and joined by short leads to the light-producing unit to minimize accidental detonation by external electromagnetic radiation.

The interior surface of opaque casing 26 supports a deposited pyrotechnic coating 35 substantially the entire length, including a hemispherically-shaped end portion 26d formed about aperture 26b. The pyrotechnic coating consists, for example, of a layerlike composition formed of ingredients such as approximately 52 percent magnesium powder, 30 percent sodium nitrate, 8 percent organic binder, and approximately 1 percent of a sensitizing additive like trinitrotoluene for increasing the light output and increasing the burning rate. By mixing this composition in a solvent, and applying it in coats to the interior of the casing, a desired thickness is built up. A built-up layer measuring 0.030 inch has been found satisfactory in the described tubularly configured light unit.

An insulating plug portion 28 is supported from the interior surface of the casing by a plurality of radially extending brace members 29 and is formed with a recess for mounting a totally reflective mirror surface 32. The totally reflective mirror surface is carried on one end of the laser rod and a partially transparent mirror surface 31 is disposed at the opposite extreme of the laser rod to provide a resonant chamber to enhance the radiation produced in the laser rod. The totally reflective mirror surface has a heavy silver coat making it a totally reflective opaque mirror, while the partially transparent mirror surface has a lesser coating of silver making it reflective in the transitional range.

The lasing material is from a number of well-known coherent, near coherent, laser types having the ability to be shaped into a cylindrical rod capable of being optically pumped at the sides. Examples include a ruby overlayed with sapphire or a gadolinium doped, a neodymium-doped or a ytterbium-doped glass overlayed with glass, depending upon the particular materials at hand and the lasing material's ability to withstand the heat and shock attendant the pyrotechnic flash.

In the one preferred form of the invention, additional protection from the pyrotechnic pumping flash is provided by a cylindrically shaped transparent glass or quartz sheath 33, coaxially disposed about the lasing material with an annular gap 34 lying adjacent the pyrotechnic coating to act as a buffer zone for the laser and sheath as the pyrotechnic is ignited. An enhanced pumping flash is realized by placing coils of a finely wound, highly active metal 36, such as magnesium or similar low refractory compound within the annular gap in physical contact with the coating. In a typical firing, a color temperature approaching 4700° Kelvin was observed upon ignition to more than adequately pump the lasing material for producing a high-energy output pulse of coherent light.

In operation, the source of high voltage power 27 a, be it a generator or a highly charged capacitor, is electrically connected to the electrically initiated squib 27. The squib ignites the pyrotechnic coating contained in aperture 26b, on hemispherically shaped end portion 26d, and throughout the interior of the casing 26. The intense flash produced, pumps the lasing material to send a burst of high energy coherent light through the bundle of optic fibers into each of the branches 15a and 15b. As the burst is focused via separate lens windows 12a onto respectively associated primary explosives 13, detonation of booster charges occurs to create detonation of the ordnance.

Figure 3:
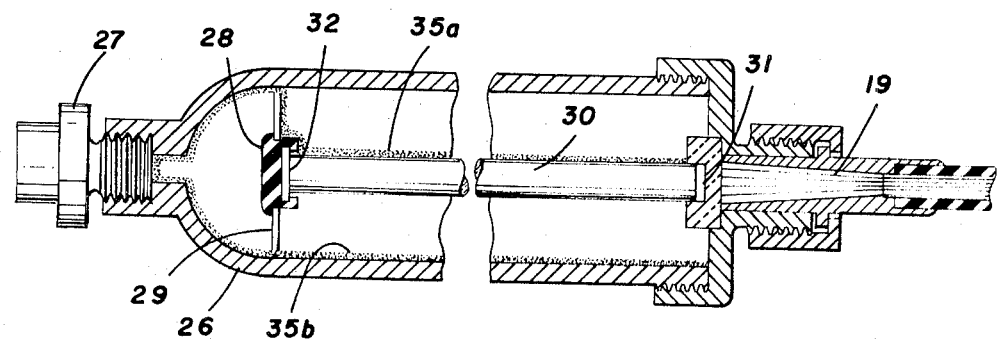
FIG. 3 depicts a cross-sectional representation of another form of the coherent light-producing unit.

In an alternate form, noting FIG. 3, a laser material 30, having superior resistance to shock and heat effects, enables the elimination of the transparent sheath 33 and the coating is applied as 36b. If the sheath, as well as annular gap 34 are eliminated, the pyrotechnic is coated directly on the lasing material itself, nothing that the upper surface of the laser material supports a coating of pyrotechnic 35a.

Being so totally shielded and free from metalic conductors, renders the invention impervious to external electromagnetic radiation and ensures a means for reliable, safe detonation of ordnance.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for remotely initiating ordnance comprising:
   a detonator assembly operatively connected to said ordnance having an element responsive to coherent light for delivering a detonating concussion thereto;
   a fiber-optic bundle terminating at one end adjacent said element and at its opposite end in a coupling;
   a coherent light-producing unit including,
      a case element having a cylindrical shell configured for connection to said coupling provided with a first aperture and a hemispherical shell closing one end of said cylindrical shell formed with a second aperture on its polar axis,
      a rod-shaped laser element coaxially disposed within said cylindrical shell mounting a totally reflective mirror and a partially transparent mirror at opposite extremes, said partially transparent mirror being oriented to optically communicate through said first aperture with said opposite end, and
      a pyrotechnic element continuously, uniformly coating the inner surface of said cylindrical shell and said hemispherical shell, and extending to said second aperture; and
   means for igniting the coated pyrotechnic element mounted on said polar axis and communicating through said second aperture to cause a flash creating an emission of said coherent light and its transfer, via said fiber-optic bundle, for initiating said ordnance.

2. An apparatus according to claim 1 in which the pyrotechnic coating is substantially, uniformly deposited on the outer surface of said laser element.

3. An apparatus according to claim 1 further including:
   an annular chamber interposed between said pyrotechnic coating and said laser element for affording concussive protection thereto upon said igniting.

4. An apparatus according to claim 3 further including:
   a cylindrically shaped transparent sheath fitted around said laser element outwardly of said annular chamber for further ensuring said protection upon said igniting.

5. An apparatus according to claim 4 further including:
   a fine active metal wire disposed adjacent said coating for enhancing said flash.

6. An apparatus according to claim 1 further including:
   a coherent light intensifier section including;
      a connecting member securing said coupling to said cylindrical shell, and
      a tapered optical fiber bundle interposed between said fiber-optic bundle for concentrating said coherent light.

* * * * *